United States Patent
Nyquist

(10) Patent No.: US 9,233,805 B2
(45) Date of Patent: Jan. 12, 2016

(54) ARRANGEMENT FOR HANDLING OF LUGGAGE

(75) Inventor: Olov Nyquist, Stockholm (SE)

(73) Assignee: Lifts All AB, Jarfalla (SE)

( * ) Notice: Subject to any disclaimer, the term of this patent is extended or adjusted under 35 U.S.C. 154(b) by 112 days.

(21) Appl. No.: 13/996,212

(22) PCT Filed: Dec. 20, 2010

(86) PCT No.: PCT/SE2010/051433
§ 371 (c)(1),
(2), (4) Date: Jul. 2, 2013

(87) PCT Pub. No.: WO2012/087192
PCT Pub. Date: Jun. 28, 2012

(65) Prior Publication Data
US 2013/0287538 A1 Oct. 31, 2013

(51) Int. Cl.
*B64F 1/36* (2006.01)
*B65G 47/74* (2006.01)
*B65G 57/03* (2006.01)
*B65G 57/28* (2006.01)
(Continued)

(52) U.S. Cl.
CPC ............... *B65G 47/74* (2013.01); *B65G 57/02* (2013.01); *B65G 57/035* (2013.01); *B65G 57/28* (2013.01); *B65G 65/00* (2013.01); *B62B 2202/24* (2013.01); *B62B 2203/10* (2013.01); *B64F 1/368* (2013.01)

(58) Field of Classification Search
USPC .......... 108/139–141; 414/277, 278, 281, 282, 414/285, 398, 673, 676, 677, 792.8, 793.4, 414/793.6, 793.8, 794.2, 794.4, 794.5, 414/794.8, 799, 914, 930; 74/89.21
See application file for complete search history.

(56) References Cited

U.S. PATENT DOCUMENTS

| | | | | |
|---|---|---|---|---|
| 3,103,284 A | * | 9/1963 | Hawkes | 414/788.7 |
| 3,224,391 A | * | 12/1965 | Cooper | 108/140 |
| 3,302,022 A | * | 1/1967 | Brenner et al. | 378/179 |

(Continued)

FOREIGN PATENT DOCUMENTS

| | | | | |
|---|---|---|---|---|
| DE | 1211994 B | * | 3/1966 | B65G 67/08 |
| DE | 2700284 | | 7/1977 | |

(Continued)

OTHER PUBLICATIONS

International Search Report for Corresponding International Application No. PCT/SE2010/051433 Mailed Sep. 19, 2011.

(Continued)

*Primary Examiner* — Gregory Adams
(74) *Attorney, Agent, or Firm* — Renner, Otto, Boisselle & Sklar, LLP

(57) ABSTRACT

The present invention relates to an arrangement for handling of luggage of an aircraft container. The arrangement helps service stall transferring luggage Items from a conveyor belt into a container device, or transferring luggage items from a container device onto a conveyor belt. The arrangement comprises a frame structure having a vertical lever and a carrier mounted for slidable motion along said vertical lever, means for vertically adjusting the carrier along said vertical lever, aid a table oriented horizontally and telescopically mounted onto said carrier for enabling positioning of the table in the horizontal plane, where each luggage item can easily be transferred into the container device or transferred from said container device by vertically adjusting and horizontally position the table and sliding the luggage item on the table.

9 Claims, 2 Drawing Sheets

(51) Int. Cl.
*B65G 65/00* (2006.01)
*B65G 57/02* (2006.01)

(56) References Cited

U.S. PATENT DOCUMENTS

| | | | |
|---|---|---|---|
| 3,888,362 A * | 6/1975 | Fletcher et al. | 414/620 |
| 3,963,288 A * | 6/1976 | Burnett | 312/209 |
| 3,982,715 A * | 9/1976 | Lindgren et al. | 248/654 |
| 4,242,025 A | 12/1980 | Thibault | |
| 4,311,425 A * | 1/1982 | Pulda | 414/791.6 |
| 4,832,203 A | 5/1989 | Nozawa | |
| 5,217,344 A * | 6/1993 | Gendrault et al. | 414/729 |
| 5,325,953 A * | 7/1994 | Doster et al. | 198/304 |
| 5,642,803 A * | 7/1997 | Tanaka | 198/535 |
| 5,716,184 A * | 2/1998 | Lowe et al. | 414/398 |
| 6,471,461 B2 * | 10/2002 | Muilwyk | 414/276 |
| 6,537,017 B2 * | 3/2003 | Stone | 414/672 |
| 2008/0118337 A1 * | 5/2008 | Vestergaard | 414/340 |
| 2010/0101461 A1 * | 4/2010 | Brault et al. | 108/140 |

FOREIGN PATENT DOCUMENTS

| | | | | |
|---|---|---|---|---|
| DE | 3347474 | | 2/1985 | |
| DE | 10012090 A1 * | | 9/2001 | B25J 15/06 |
| DE | 102007017288 A1 * | | 10/2008 | |
| EP | 0069991 | | 1/1983 | |
| EP | 2096054 | | 9/2009 | |
| EP | 2354004 A1 * | | 8/2011 | |
| JP | 9118311 | | 5/1997 | |

OTHER PUBLICATIONS

International Preliminary Report on Patentability for Corresponding International Application No. PCT/SE2010/051433 dated Apr. 10, 2013.

* cited by examiner

ARRANGEMENT FOR HANDLING OF LUGGAGE

TECHNICAL FIELD

The present invention relates to an arrangement for handling of luggage, in particular it relates to an arrangement for handling of luggage by transferring of luggage into or out of, respectively, a container device.

BACKGROUND

Transferring of luggage into and out of, respectively, an aircraft is associated with problems. Luggage is generally transported to an aircraft container or a Unit Loading Device, ULD, via a conveyor belt on which the luggage, for instance suitcases, bags and trolleys are carried.

The luggage shall then be moved from the conveyor belt into the aircraft container. The luggage is usually manually carried from the conveyor belt to the container device. This is in itself a cumbersome process since bags can weigh up to 100 kg.

In addition, there is a problem to achieve a sufficiently high filling level for each container, since manually lifting heavy suitcases high up is had job in the long run.

Since aircraft containers are designed with a ceiling, cranes with hanging suitcases have no access to upper levels of a luggage pile in the interior of containers.

Prior art techniques accordingly fail to provide a tool with which staff personnel can transfer luggage items into or out of an aircraft container without risking back injury or ergonomically dangerous situations.

There is a thus a need for an improved arrangement for handling of baggage with which airport service personnel can easily transfer to or from aircraft containers.

SUMMARY

It is an object of the present invention to provide improved arrangement for handling of baggage related to aircraft containers.

By using a translatable table which can be elevated and deelevated by using pneumatic or hydraulic means, each baggage item is carried on the table and translated into the aircraft container.

According to an aspect of the present invention, there is provided an arrangement for transferring luggage items from a conveyor belt into a container device, or transferring luggage items from a container device onto a conveyor belt, said arrangement comprising:
- a frame structure having a vertical pillar and a carrier mounted for slidable motion along said vertical pillar,
- means for vertically adjusting the carrier along said vertical pillar, and
- a table oriented horizontally and telescopically mounted onto said carrier for enabling positioning of the table in the horizontal plane relative to the carrier,
- whereby each luggage item can easily be transferred into the container device or transferred from said container device by vertically adjusting and horizontally position the table and sliding the luggage item on the table, such that the interior space of the container device can be fully accessed.

The means for vertically adjusting the carrier may further comprise one of pneumatic means, hydraulic means and electrically driven means.

The table of the arrangement may be telescopically mounted in both a lateral and a transversal direction in the horizontal plane.

The table of the arrangement may be axially mounted enabling rotation of said table in the horizontal plane.

The arrangement may further comprise an upper surface of the horizontally oriented table, wherein said upper surface can be designed for enabling sliding of luggage items onto or from the table.

The upper surface of the arrangement may comprise a layer of tetra-fluoro ethene.

The upper surface of the arrangement may be configured with rollers and/or spheres, for enabling lateral and transversal motion of the luggage item relative to the upper surface of the table.

The table of the arrangement may be mounted onto said carrier via a tilting unit, enabling additional tilting of the table.

The table of the arrangement may comprise a first handle with which the means for vertically adjusting the carrier along said vertical pillar is controlled.

The table of the arrangement may comprise a second handle for manual translation and/or rotation of the table relative to the frame structure.

The frame structure of the arrangement may be floor based or mounted in a ceiling structure of a building housing the arrangement.

Among the advantages with embodiments of the present invention can be mentioned:

The arrangement for transferring luggage items to or from an aircraft container has the advantage that the arrangement lifts the luggage to be transferred, instead of ordering the service staff personnel to lift the luggage items.

Each aircraft container can be filled to a higher degree since the arrangement is configured to translate each luggage item to a position in the container where a suitable space id located.

BRIEF DESCRIPTION OF DRAWINGS

In order to explain advantages and features of the present invention herein in more detail a few embodiments will be described below, where references are made to the accompanying drawings, for which

DETAILED DESCRIPTION

It is thus evident that transferring of luggage into and/or out of an aircraft container involves at least potentially problematic tasks.

The embodiments of the present invention are therefore designed to facilitate transferring of luggage items into or out of aircraft containers.

By providing an arrangement having means for vertical adjustment of a table onto which a luggage can be positioned, the service staff will no longer have to carry the luggage items manually, but can make use of the arrangement of the present invention, by which they can easily achieve a high filling level of each container device.

The present invention concerns an arrangement for transferring luggage items from a conveyor belt into a container device, or transferring luggage items from a container device onto a conveyor belt. The arrangement comprises a frame structure having a vertical pillar and a carrier mounted for slidable motion along said vertical pillar, means for vertically adjusting the carrier along said vertical pillar, and a table oriented horizontally and telescopically mounted onto said carrier for enabling positioning of the table in the horizontal plane, whereby each luggage item can easily be transferred into the container device or transferred from said container device by vertically adjusting and horizontally position the table and sliding the luggage item on the table, such that the interior space of the container device can be fully accessed.

Figure 1:
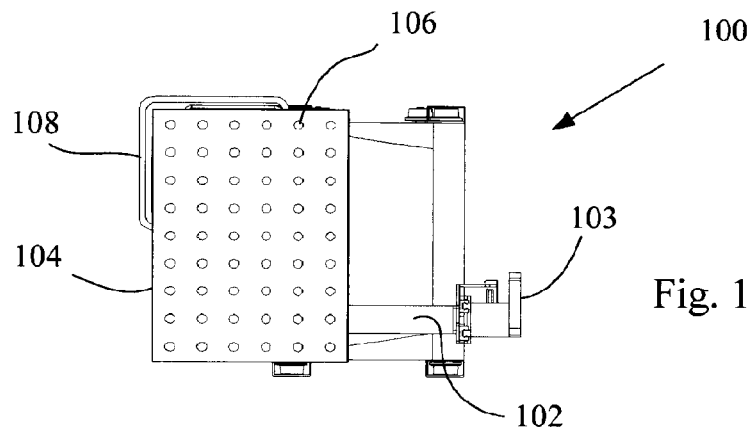
FIG. 1 illustrates a side-view of an arrangement related to a first embodiment of the present invention.
Figure 2:
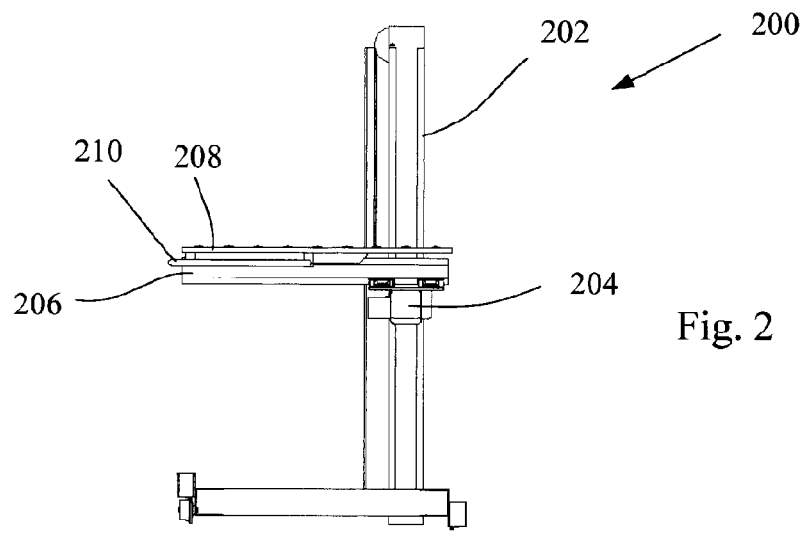
FIG. 2 illustrates a front-view of an arrangement related to a first embodiment of the present invention.

FIGS. 1 and 2 schematically presents a top-view and a side-view, respectively, of such an arrangement 100, 200 according to embodiments of the present invention.

In FIG. 1 the arrangement 100 has a frame structure comprising a vertical pillar 103 along which a carrier can be slid. At the carrier a horizontal lateral telescopic arm 102 is mounted for enabling the table 104 to be translated along said arm. It should be mentioned that a telescopic transversal arm is further mounted on the lateral arm 102 for enabling the table to be moved related to the carrier in both a lateral and a transversal direction in said horizontal plane.

FIG. 1 further illustrates a handle 108 by which a user or service staff personnel can control the vertical position by activating means for vertically adjusting the table along said vertical pillar 103.

The arrangement may also comprise a second handle from manual translation and/or rotation of the table relative to the carrier and thereby the frame structure. The table may in addition be axially mounted onto the transversal/lateral telescopic arms, to enable rotational motion of the table relative to the carrier and the frame structure.

FIG. 1 also schematically illustrates means rollers 106 positioned on an upper surface of the table 104, which rollers are configured to roll in any direction in the horizontal plane enabling lateral and transversal motion of a luggage item relative to the upper surface of the table.

FIG. 2 presenting a side-view of an arrangement more clearly depicts the vertical pillar 202 as well as the carrier 204 configured to be slid along the vertical pillar. The vertical pillar may for these ends be configured as a rail in which the carrier can be slid. Alternatively, the carrier comprises a rail that is slid along a rail-meeting vertical pillar.

A telescopic arm 206 is also revealed in FIG. 2, which arm enables the table 208 to be translated along said arm. A handle for either controlling the vertical position of the table of for manually translating and/or rotating the table is identified as 210.

It must be emphasized that the means for vertically adjusting the carrier, and therefore also the table, can comprise pneumatic means, hydraulic means or electrically driven means.

In addition, the table 104, 208, 308 may also be mounted at the carrier 204, 304 or at the telescopic arms 206, 306, via a tilting unit that enables the table to be tilted, for further facilitated operation of sliding luggage items onto or from the table.

Figure 3:
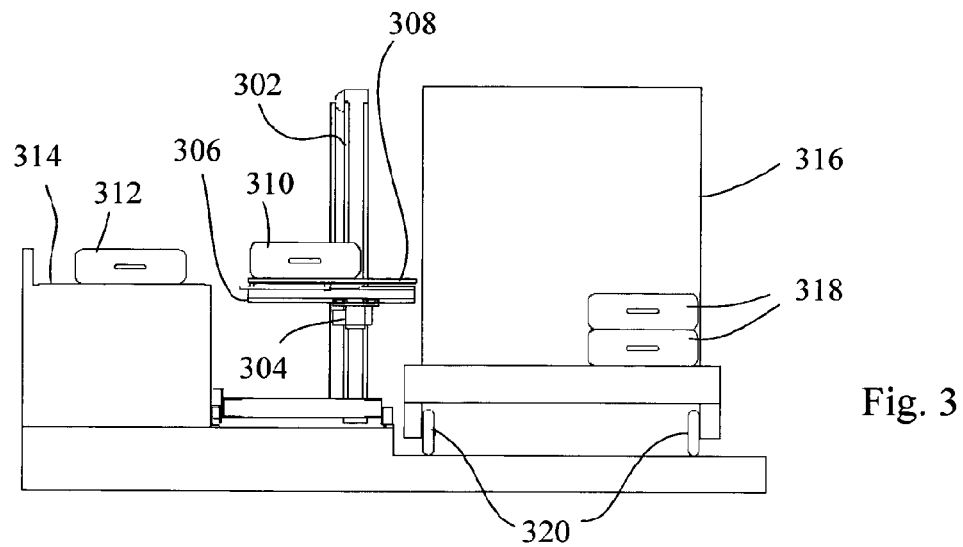
FIGS. 3-5 illustrate transfer examples involving an arrangement according to embodiments of the present invention.
Figure 4:
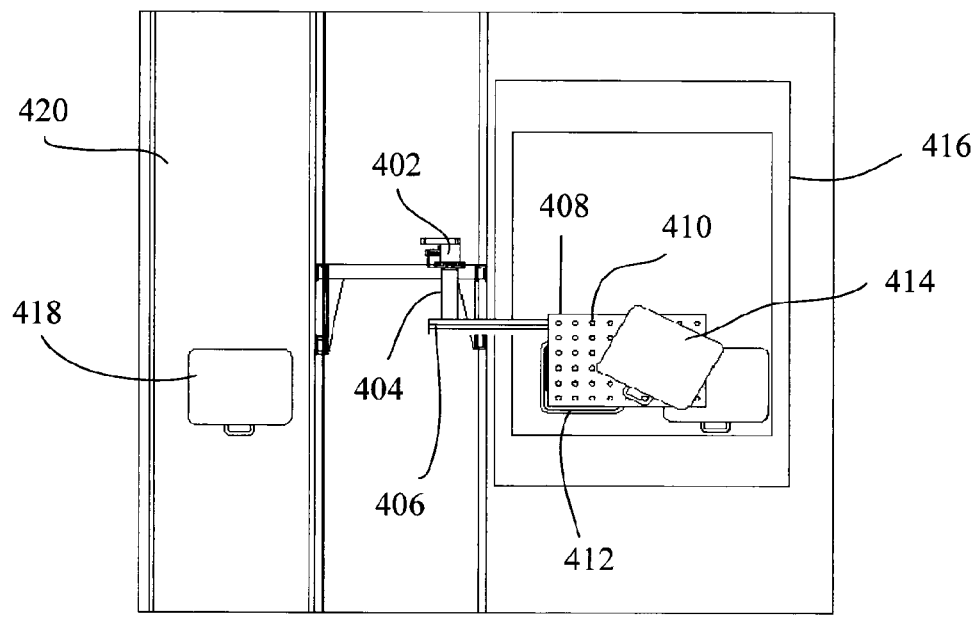
Figure 5:
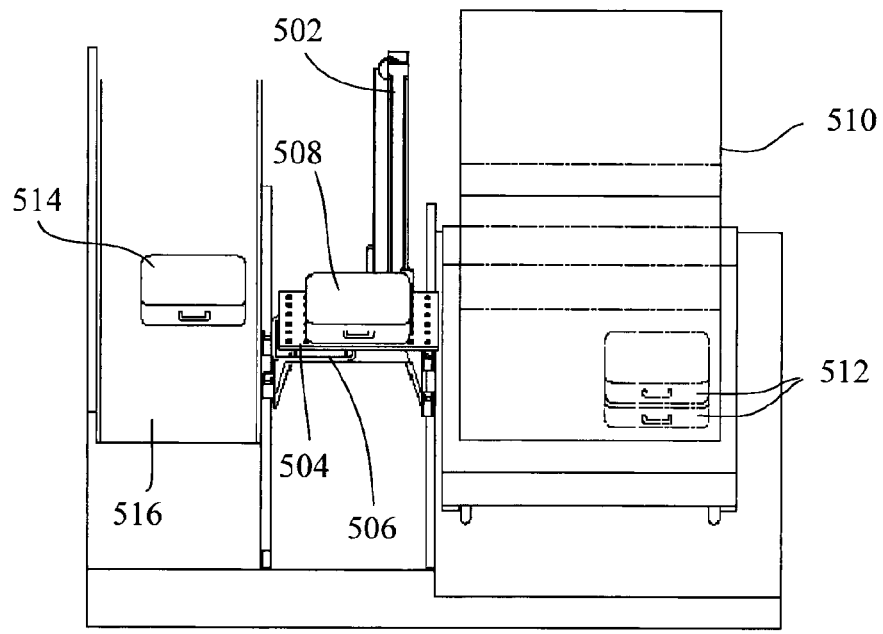

FIGS. 3-5 as attached to illustrate the proposed usage of the arrangement of the present invention. It can be mentioned that the arrangement can just as well be used to transferring luggage items from one container device to another container device or from one place to another place.

It is presented vertical pillar 302, 402, 502 along which the carrier 304 can be slid by means for vertically adjusting said carrier along said pillar. A transversal telescopic arm 404 as well as a lateral telescopic arm 406 is also depicted to enable free motion of table 308, 408, 504 in the horizontal plane, by manually moving said table horizontally by a handle, for instance handle 412, 506.

Further it is illustrated that a luggage item such as a suitcase 310, 410, 508 is transferred on the table between a conveyor belt 314, 420, 516 and a container unit 316, 416, 510, such as a Unit Loading Device, ULD. The conveyor belt can either transport luggage items 312, 418, 514 to or from the arrangement. The container unit 316, 416, 510 can be loaded to comprise a number of suitcases of which two suitcases 318, 512 are illustrated in FIGS. 3-5.

FIG. 4 clearly illustrates that the horizontally adjustable and manually translatable/rotatable table 408 can reach awkward positions within the container unit 416, such that suitcase 414 can be easily slid onto the table 408 or from the table at the proper vertical level. The table 408 can be configured with means 410 for reducing the friction between a suitcase lying on the upper surface of the table. Such means 410 can comprise rollers, or spheres or even a combination of rollers and spheres, enabling a facilitated sliding motion of the suitcase relative to the table 408 by manual interaction by service staff personnel.

Alternatively, the upper surface may be configured with a layer of a fluoropolymer such as tetra-fluoro ethane, for facilitated sliding of luggage items.

FIGS. 3-5 further illustrate the arrangement being floor based, where a container 316 is configured with rotatable wheels 320 for facilitated feeding of empty or full container devices for the arrangement of the present invention.

Moreover the arrangement may alternatively be mounted in a ceiling wherewith the vertical pillar typically is attached in the ceiling of a building housing the arrangement.

It must also be emphasized that the present invention can be varied in many ways. The presented embodiments of the present invention are only examples of embodiments that are comprised within the present invention.

It can be mentioned that the arrangement is configured for transporting or transferring luggage from a conveyor lateral or a conveyor carousel to a trolley or from a trolley to a conveyor lateral or a conveyor carousel.

Among the advantages of the embodiments of the present invention the following can be mentioned:

The arrangement for transferring luggage items to or from an aircraft container has the advantage that the arrangement lifts the luggage to be transferred instead of having service staff personnel to lift said luggage items. This has several ergonomics advantages.

It is moreover a great advantage that the arrangement is configured and designed to be able to carry loads in the form of special luggage up to 100 kg.

Each aircraft container can be filled to a higher degree since the arrangement is configured to translate each luggage item to a position in the container where a suitable space id located.

The invention claimed is:

1. An arrangement for transferring luggage items from a conveyor belt into a container device and for transferring luggage items from a container device onto a conveyor belt, said arrangement comprising:
   a frame structure having a vertical pillar,
   a carrier mounted for slidable motion vertically along said vertical pillar,
   means for vertically moving the carrier along said vertical pillar, and
   a table oriented horizontally, the table comprising a surface area at which luggage items may be placed and from which luggage items may be removed, and a first handle and a second handle, the handles being capable of manual manipulation to position the table;

a lateral telescopic arm supporting the table for movement by the lateral telescopic arm closer and further from the carrier with decreasing and increasing extent of the lateral telescopic arm, a transversal arm configured to mount the lateral telescopic arm to the carrier for movement of the lateral telescopic arm along the transversal arm relative to the carrier, whereby one end of the lateral telescopic arm is movable in a horizontal plane that is generally perpendicular to the vertical pillar, the lateral telescopic arm and the transversal arm being cooperative to mount the table relative to the carrier while enabling positioning of the table in both the horizontal plane relative to the carrier and vertically in parallel to the vertical pillar by manually moving at least one of the handles, said table including means for reducing friction between its upper surface and luggage items, such that a sliding motion of the luggage items relative the table is facilitated, whereby each luggage item can be transferred into the container device or transferred from the container device by vertically adjusting and horizontally positioning the table and, by manual interaction, sliding the luggage item on the table, such that interior space of the container device can be fully accessed.

2. The arrangement of claim 1, wherein the table is telescopically mounted in both a lateral and a transversal direction in the horizontal plane.

3. The arrangement of claim 1, wherein the table in addition is axially mounted enabling rotation of said table in the horizontal plane.

4. The arrangement of claim 1, wherein the upper surface of the table comprises a layer of tetra-fluoroethene.

5. The arrangement of claim 1, wherein the upper surface is configured with rollers and/or spheres, for enabling lateral and transversal motion of the luggage item relative to the upper surface of the table.

6. The arrangement of claim 1, wherein the first handle is provided for controlling the vertical position of the carrier along said vertical pillar.

7. The arrangement of claim 1, wherein the frame structure is floor based or mounted in a ceiling structure of a building housing the arrangement.

8. The arrangement of claim 1, wherein each luggage item can be transferred into the container device or transferred from said container device one at a time.

9. The arrangement of claim 1, wherein the table is telescopically mounted onto said carrier via the lateral telescopic arm carried by the transversal arm for manually enabling positioning of the table in the horizontal plane relative to the carrier.

* * * * *